United States Patent [19]

Maine et al.

[11] Patent Number: 5,500,648
[45] Date of Patent: Mar. 19, 1996

[54] GEOLOCATION RESPONSIVE RADIO TELECOMMUNICATION SYSTEM AND METHOD THEREFOR

[75] Inventors: Kristine P. Maine, Phoenix; Keith A. Olds, Mesa, both of Ariz.; Gerald J. Davieau, Eldersburg, Md.

[73] Assignee: Motorola, Inc., Schaumburg, Ill.

[21] Appl. No.: 105,730

[22] Filed: Aug. 11, 1993

[51] Int. Cl.⁶ ........................................ G01S 5/02
[52] U.S. Cl. ................ 342/357; 364/459; 455/13.2
[58] Field of Search .................................... 342/352, 356, 342/357; 364/459; 455/13.2

[56] References Cited

U.S. PATENT DOCUMENTS

| | | | |
|---|---|---|---|
| 4,445,118 | 4/1984 | Taylor et al. | 343/357 |
| 4,578,678 | 3/1986 | Hurd | 343/357 |
| 4,599,620 | 7/1986 | Evans | 343/357 |
| 4,797,677 | 1/1989 | MacDoran et al. | 342/352 |
| 4,827,421 | 5/1989 | Dondl | 364/459 |
| 4,943,808 | 7/1990 | Dulck et al. | 342/356 |
| 5,041,833 | 8/1991 | Weinberg | 342/357 |
| 5,119,504 | 6/1992 | Durboraw, III | 455/54.1 |
| 5,343,512 | 8/1994 | Wang et al. | 379/59 |

OTHER PUBLICATIONS

"Emitter Location Accuracy Using TDOA and Differential Doppler" by Paul C. Chestnut, from IEEE Transactions on Aerospace and Electronic Systems, vol. AES–18, No. 2, Mar., 1982.

"Geolocation of Frequency–Hopping Transmitters via Satellite" by A. Sonnenschein and W. K. Hutchinson, from Technical Reporty 900, Nov. 1990.

"Geolocation via Satellite: A Methodology and Error Analysis" by M. J. Shensa, from Technical Report 1224, May 1988.

*Primary Examiner*—Thomas H. Tarcza
*Assistant Examiner*—Dao L. Phan
*Attorney, Agent, or Firm*—Kevin K. Johanson; Robert M. Handy; Phillip E. Hall

[57] ABSTRACT

A radio telecommunication system includes a number of satellites in low earth orbits. Any number of subscriber units communicates with the satellites. A single subscriber unit communicates with a single satellite using electromagnetic signals so that a measurement processor can obtain Doppler component, propagation duration, and real time measurements of the signals. A location processor converts these measurements into a geographic location with respect to the earth. A service processor determines which qualifications to apply to communication services offered by the system. These qualifications are based on the subscriber unit's location. A call processor carries out the qualifications when requests to setup calls involving the subscriber unit are received by the system and during calls involving the subscriber unit.

20 Claims, 7 Drawing Sheets

1

GEOLOCATION RESPONSIVE RADIO TELECOMMUNICATION SYSTEM AND METHOD THEREFOR

CROSS-REFERENCE TO RELATED APPLICATIONS

This application is related to commonly assigned United States Patent Applications:

"Multibeam Position Ambiguity Resolution", by Keith Olds, U.S. Pat. No. 5,412,389; "Position Ambiguity Resolution", by Stanley Attwood, U.S. Pat. No. 5,418,388; "Radio Telecommunications System and Method with Adaptive Convergence Location Determination", by Keith Olds and Kristine Maine, Ser. No. 08/105,219; and "Location System and Method with Acquistion of Accurate Location Parameters", by Kristine Maine, Keith Olds and Stanley Attwood, Ser. No. 08/105,227.

TECHNICAL FIELD OF THE INVENTION

The present invention relates generally to radio telecommunication systems that provide communication services for the systems' users. More specifically, the present invention relates to radio telecommunication systems in which communications are relayed through satellites and in which locations of users' subscriber units are determined.

BACKGROUND OF THE INVENTION

A need exists for a substantially global radio telecommunication system that can provide communication services to substantially any point on or near the surface of the earth. For such a system to achieve widespread acceptance, it should be capable of operating with portable subscriber units. In order for subscriber units to have acceptable portability, they should be capable of low power battery operation, and they should be capable of transmitting and receiving electromagnetic signals through a relatively small antenna. In addition, such a system should use only portions of the electromagnetic spectrum which are allocated to it by governments within whose geopolitical jurisdictions the system is used.

In such a global radio telecommunication system, subscriber units may be placed in the control of system users, and the users may move their subscriber units to any place on or near the surface of the earth. In short, the system and those who operate the system may have no control over where the subscriber units are located. On the other hand, the system may be responsible for granting or denying particular communication services depending upon whether or not the system has received permission to operate at a point where a particular subscriber unit may be located. Moreover, the system may be responsible for billing in connection with the use of communication services, and the rates charged for such services may vary from location to location due to tariffs and the like.

A radio telecommunication system may carry out the job of granting and denying particular communication services and assigning particular billing rates to calls if it knows the locations of the subscriber units. Accordingly, it would be desirable to configure the system so that the locations of subscriber units may be determined and so that information describing locations may be transmitted to controllers which are responsible for making decisions regarding the granting or denying of communication services, billing rates, and the like.

Many prior art location determination systems are known, such as Global Positioning System (GPS), GLONASS, Loran, and the like. While subscriber units could be configured to incorporate components which take advantage of such location determination systems, these components would substantially increase costs of the subscriber units. Moreover, relying on such known location determination systems could reduce reliability of the radio telecommunication system by introducing reliance upon an external system.

The techniques used by such prior art systems to determine location could potentially be incorporated into the radio telecommunication system, but the introduction of such techniques could seriously degrade communication services. For example, many prior art location systems require the use of two or more transmitters or receivers ("locators") that are located at distant positions and that are capable of transmitting or receiving signals to or from a location to be determined.

The requirement for two or more locators to be within view over the entire globe, when combined with a global telecommunication capability, makes this approach unduly cumbersome. While this requirement might be met by placing satellites in high or geosynchronous orbits around the earth, higher orbits place satellites further away from subscriber equipment on the earth. This larger distance causes the subscriber equipment to consume excessive power or incorporate larger antennas just to participate in communication services. Moreover, higher orbits require increased spectrum allocation to carry a given amount of communications because the allocated spectrum may be reused less frequently in a given area.

SUMMARY OF THE INVENTION

Accordingly, it is an advantage of the present invention that an improved radio telecommunication system and method are provided.

Another advantage of the present invention is that locations for subscriber units are automatically determined.

Another advantage is that the present invention may determine locations for subscriber units using no more that a single satellite which orbits the earth in a low earth orbit.

Another advantage is that the present invention utilizes location information to qualify communication services.

The above and other advantages of the present invention are carried out in one form by a method of operating a radio telecommunication system having at least one satellite moving in an orbit around the earth and having at least one subscriber unit located proximate the earth's surface. The method calls for determining a Doppler component of an electromagnetic signal traveling between the satellite and the subscriber unit. A location of the subscriber unit relative to the earth is determined in response to this Doppler component. Communication services provided for the subscriber unit are qualified in response to this location.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
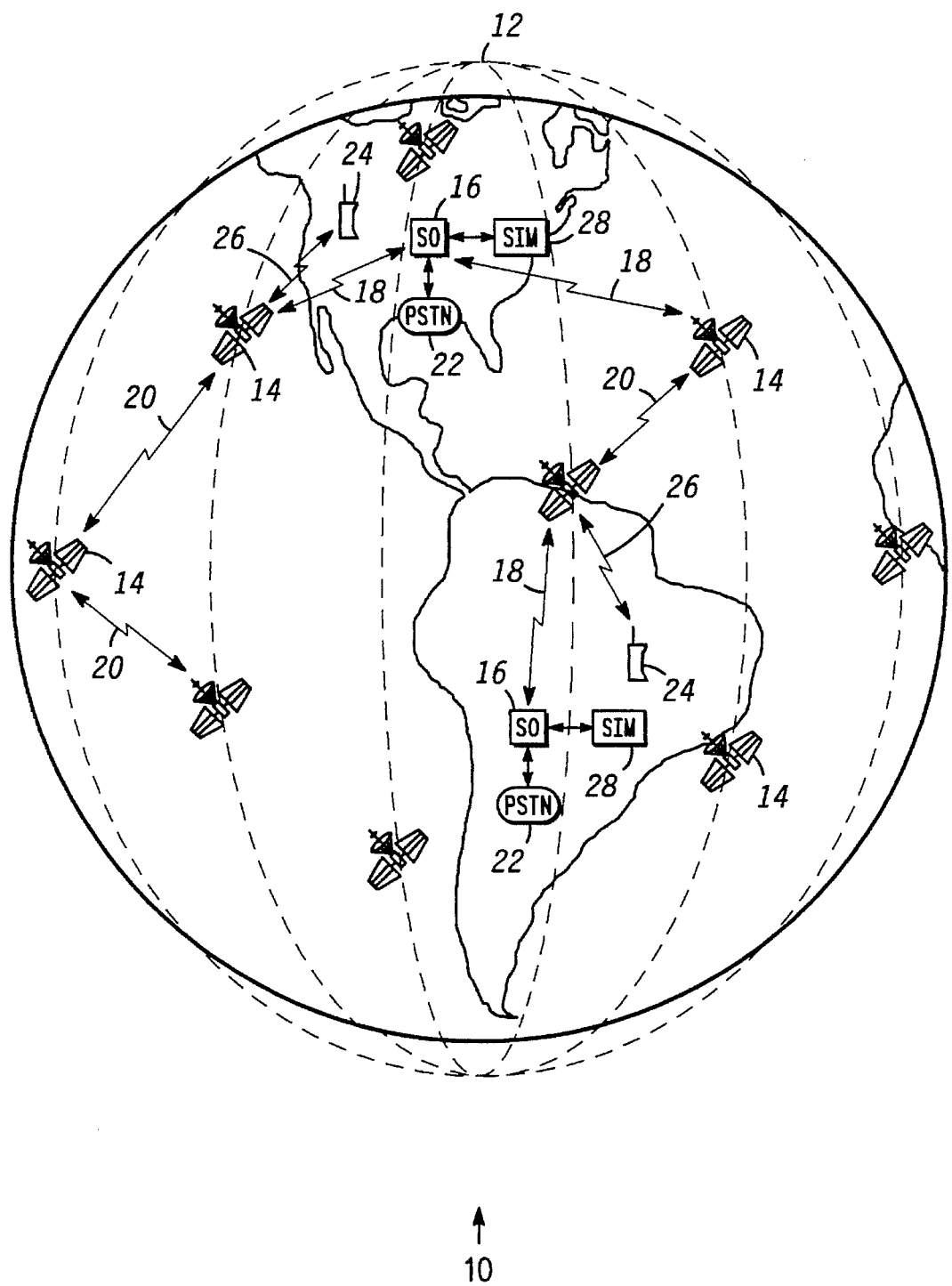
FIG. 1 shows a layout diagram of an environment within which a radio telecommunication system may operate.

FIG. 1 shows a layout diagram of an environment within which a radio telecommunication system 10 operates. System 10 includes a constellation 12 of several satellites 14 placed in relatively low orbits around the earth.

System 10 additionally includes one or more switching offices (SOs) 16. SOs 16 reside on the surface of the earth and are in data communication with nearby ones of satellites 14 through RF communication channels 18. Satellites 14 are also in data communication with one another through data communication channels 20. Hence, through constellation 12 of satellites 14, an SO 16 may control communications delivered to any size region of the earth. However, the region controlled by each SO 16 is preferably associated with one or more specific geo-political jurisdiction, such as one or more countries. SOs 16 couple to public switched telecommunication networks (PSTNs) 22, from which calls directed toward subscribers of system 10 may be received and to which calls placed by subscribers of system 10 may be sent.

System 10 also includes any number, potentially in the millions, of subscriber units (SUs) 24. SUs 24 may be configured as conventional portable radio communication equipment. In other words, SUs 24 may be battery powered, may consume relatively low power, and may include relatively small antennas. System 10 accommodates the movement of SUs 24 anywhere on or near the surface of the earth. However, nothing requires SUs 24 to move, and system 10 operates satisfactorily if a portion of the entire population of SUs 24 remains stationary. SUs 24 are configured to engage in communications with satellites 14 over portions of the electromagnetic spectrum that are allocated by governmental agencies associated with various geopolitical jurisdictions. SUs 24 communicate with nearby satellites 14 through communication channels 26.

Any number of subscriber information managers (SIMs) 28 are also included within system 10. Each SIM 28 maintains a subscriber database that is relevant to only a discrete portion of the population of SUs 24. The database may include information describing features associated with SUs 24, billing rates to be associated with SUs 24, current locations for SUs 24, and other information which is discussed below. Each SU 24 is assigned to one of SIMS 28, and that one SIM 28 is considered the "home" SIM 28 for an SU 24. In the preferred embodiment, an SIM 28 may be associated with each SO 16. In fact, an SIM 28 and an SO 16 may utilize the same computerized hardware. In such an embodiment, an SIM 28 and an SO 16 are separated logically rather than physically. Each SO 16 may communicate with any SIM 28 through constellation 12, PSTN 22, or internal computer structures when an SO 16 communicates with its logical partner SIM 28.

In general terms, system 10 may be viewed as a network of nodes. Each SU 24, satellite 14, SO 16, and SIM 28 represents a node of system 10. All nodes of system 10 are or may be in data communication with other nodes of system 10 through communication channels 18, 20, and/or 26. In addition, all nodes of system 10 are or may be in data communication with other telephonic devices dispersed throughout the world through PSTNs 22. Due to the configuration of constellation 12 of satellites 14, at least one of satellites 14 is within view of each point on the surface of the earth at all times. Communication services, including calls, may be set up between two SUs 24 or between any SU 24 and a PSTN phone number. Except for qualifying processes which are discussed below, calls may be set up between any two locations on the earth. Generally speaking, each SU 24 engages in control communications with a nearby SO 16 through constellation 12 during call setup. These control communications take place prior to forming a communication path between an SU 24 and another unit, which may be another SU 24 or a PSTN phone number. In particular, an SU 24 communicates with the SO 16 via one or more satellites 14. This SO 16 may be considered the serving SO for that particular SU 24.

Due to the low earth orbits, satellites 14 constantly move relative to the earth. In the preferred embodiments, satellites 14 move in orbits at an altitude in the range of 500–1000 km above the earth. If, for example, satellites 14 are placed in orbits which are around 765 km above the earth, then an overhead satellite 14 travels at a speed of around 25,000 km/hr with respect to a point on the surface of the earth. Electromagnetic signals traveling at or near the speed of light between an SU 24 positioned near the surface of the earth and a satellite 14 in such an orbit will require a propagation duration of 2–3 msec or more, depending on the satellite's angle of view. Moreover, electromagnetic signals traveling between an SU 24 positioned near the surface of the earth and a satellite 14 in such an orbit may experience a considerable Doppler component of frequency shift, the precise value of which is dependent on a source frequency and the satellite's angle of view.

Due to the relatively low orbits of satellites 14, line-of-sight electromagnetic transmissions from any one satellite cover a relatively small area of the earth at any point in time. For example, when satellites 14 occupy orbits at around 765 km above the earth, such transmissions may cover areas around 4000 km in diameter.

Figure 2:
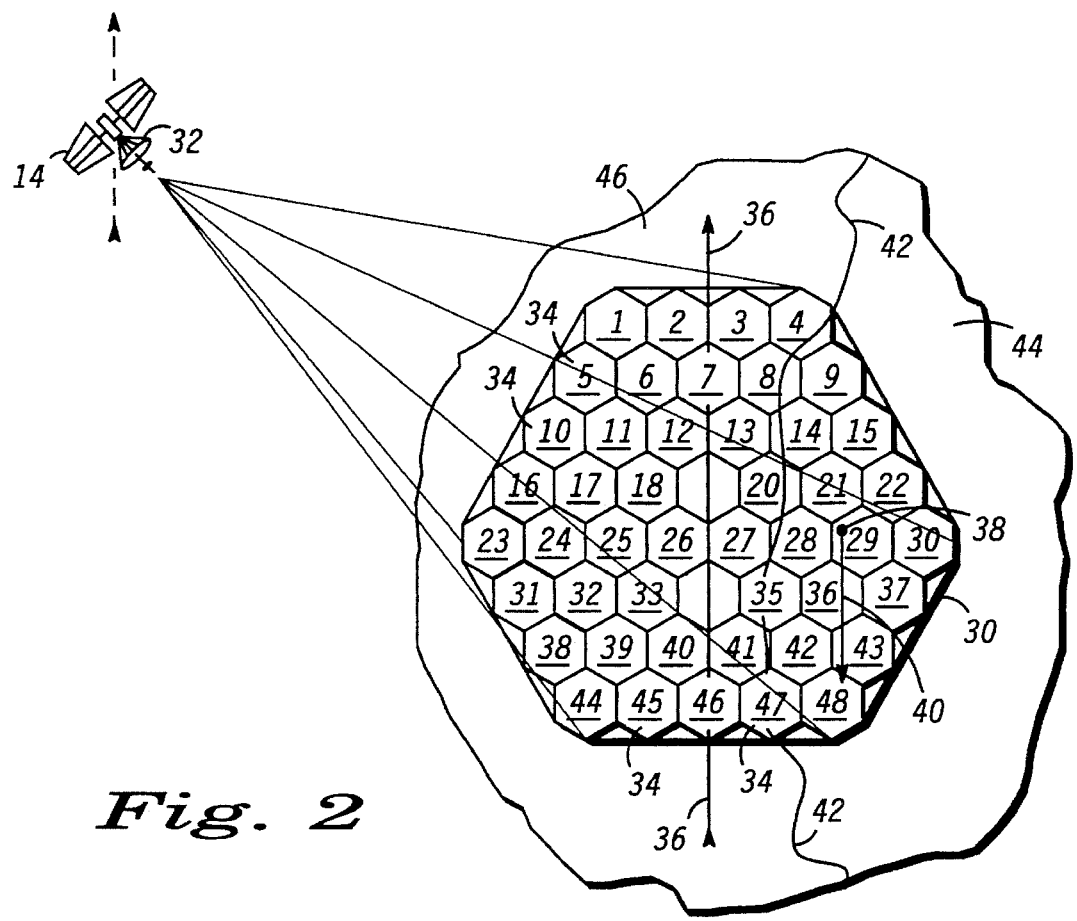
FIG. 2 shows a cellular pattern formed on the surface of the earth by a satellite portion of the radio telecommunication system.

FIG. 2 shows a cellular footprint pattern 30 formed on the surface of the earth by a single satellite 14. Each satellite 14 includes an array 32 of directional antennas. Each array 32 projects numerous discrete antenna patterns on the earth's surface at numerous diverse angles away from its satellite 14. FIG. 2 shows a diagram of a resulting pattern of cells 34 that a satellite 14 forms on the surface of the earth. Other satellites 14 (not shown) form other footprints (not shown) adjacent to the footprint 30 shown in FIG. 2 so that substantially the entire surface of the earth is covered by cells 34.

Each cell 34 within footprint 30 occupies a unique position within footprint 30. These positions are distinguished from one another through the use of a cell ID, listed as 1 through 48 in FIG. 2. Some degree of location information may be obtained by identifying a cell 34 that covers a position of interest. Such location information defines a position relative to a satellite 14. Satellites 14 preferably orbit the earth in predictable orbits. In other words, a satellite's position at a particular point in time may be determined by combining the point in time with well known orbital geometry. By combining a cell's position within a footprint 30 with the satellite's position, a location on the earth may be obtained.

For convenience, FIG. 2 illustrates cells 34 and footprint 30 as being discrete, generally hexagonal shapes without overlap or gaps. However, those skilled in the art will understand that in actual practice equal strength lines projected from the antennas of satellites 14 may be more circular or elliptic than hexagonal, that antenna side lobes may distort the pattern, that some cells 34 may cover larger areas than other cells 34, and that some overlap between adjacent cells may be expected.

System 10 (see FIG. 1) communicates through satellites 14 with all of SUs 24 (see FIG. 1) using a limited amount of the electromagnetic spectrum. The precise parameters of this spectrum are unimportant to the present invention and may vary from system to system. The present invention divides this spectrum into discrete portions or channel sets. The precise manner of dividing this spectrum is also unimportant to the present invention. For example, the spectrum may be divided into discrete frequency bands, discrete time slots, discrete coding techniques, or a combination of these. Desirably, each of these discrete channel sets is orthogonal to all other channel sets. In other words, simultaneous communications may take place at a common location over every channel set without significant interference. As is conventional in cellular communication systems, the channel sets are assigned to cells 34 through a reuse scheme which prevents adjacent cells 34 from using the same channel sets. However, common channel sets are reused in spaced apart cells 34 to efficiently utilize the allocated spectrum.

Each satellite 14 is associated with a nadir direction. The nadir direction is defined by an imaginary line (not shown) extending from the satellite 14 toward the center of the earth. For a given satellite 14, a ground point resides where the nadir direction intersects the surface of the earth. As the satellite 14 moves around the earth in its orbit, this ground point forms a satellite ground track 36. As shown in FIG. 2, a first portion of cells 34 in footprint 30 resides to the left of ground track 36 and a second portion of cells 34 in footprint 30 resides to the right of ground track 36.

FIG. 2 shows a point 38, which illustrates an example position for an SU 24 on the surface of the earth at a particular point in time. Of course, those skilled in the art will appreciate that this is merely an example and that any SU 24 may reside at any point on or near the surface of the earth. As satellite 14 moves relative to the earth, footprint 30 and cells 34 likewise move relative to the earth. As a result of this movement, a subscriber unit cell track 40 is formed through cells 34. Those skilled in the art will appreciate that point 38 need not actually move relative to the earth as depicted in FIG. 2. Rather, point 38 moves primarily with respect to cells 34 to form cell track 40.

On the surface of the earth, a boundary 42 separates a first jurisdiction 44 from a second jurisdiction 46. Any number of boundaries 42 may divide the entire earth's surface into any number of different jurisdictions. Boundaries 42 need not represent physical phenomena of the earth. Rather, boundaries 42 represent lines imposed over the geography of the earth to achieve some of the goals of radio telecommunication system 10 (see FIG. 1), and nothing prevents the existence of more than one set of boundaries 42 corresponding to the same sections of the earth. For example, one set of boundaries 42 may divide the earth into geopolitical jurisdictions so that system 10 can define where communication services are to be allowed and where communication services are to be denied. The same or an entirely separate set of boundaries 42 may divide the earth into rate jurisdictions so that system 10 can define where various rate schedules are to be applied. The same or yet another set of boundaries 42 may divide the earth into feature jurisdictions so that system 10 can define where various communication service features are to be applied. The geopolitical jurisdictions, rate jurisdictions, and feature jurisdictions may, but need not, observe the same boundaries.

Figure 3:
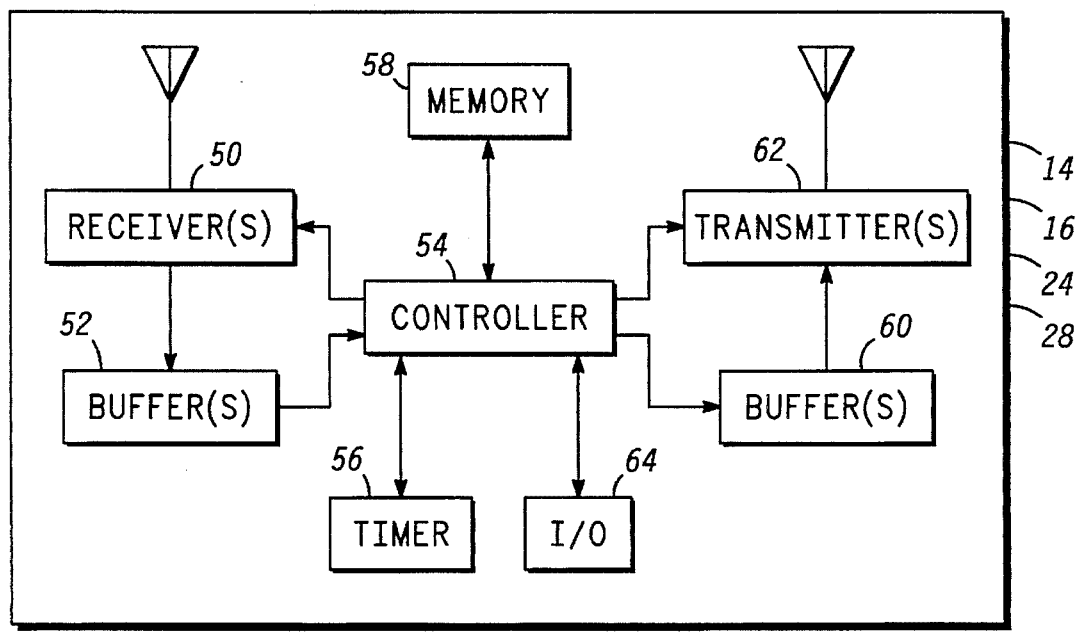
FIG. 3 shows a block diagram of a node of the radio telecommunication system.

FIG. 3 shows a block diagram of any node 48 of radio telecommunication system 10 (see FIG. 1). As discussed above, any SU 24, satellite 14, SO 16, or SIM 28 represents a node of system 10. Node 48 includes one or more receivers 50. Receivers 50 receive signals from communication channels 18, 20, and/or 26 (see FIG. 1). While an SU 24, SO 16, or SIM 28 may include only a single receiver 50, a satellite 14 includes many receivers for simultaneously communicating over numerous different ones of channels 18, 20, and 26 (see FIG. 1). Receivers 50 couple to receive buffers 52, which temporarily store data received at receivers 50 until these data can be processed.

A controller 54 couples to receive buffers 52 and to receivers 50. Controller 54 couples to receivers 50 to control receive parameters, such as frequency, timing, and the like. Controller 54 additionally couples to a timer 56, a memory 58, transmit buffers 60, and transmitters 62. Controller 54 uses timer 56 to help monitor real time through maintaining the current date and time. Memory 58 includes data which serve as instructions to controller 54 and which, when executed by controller 54, cause node 48 to carry out processes which are discussed below. In addition, memory 58 includes variables, tables, and databases that are manipulated due to the operation of node 48. Transmit buffers 60 are used to temporarily store data placed therein by controller 54. Controller 54 couples to transmitters 62 to control transmit parameters, such as frequency, timing, and the like. While SUs 24, SOs 16, and SIMs 28 may include only one transmitter 62, satellites 14 desirably include numerous transmitters 62 for simultaneously communicating over numerous different ones of channels 18, 20, and 26 (see FIG. 1). Transmit buffers 60 also couple to transmitters 62. Transmitters 62 transmit signals modulated to carry the data stored in transmit buffers 60. These signals are transmitted over channels 18, 20, and 26.

In earth-based nodes 48, controller 54 also couples to an I/O section 64. In an SU 24, I/O section 64 may include microphones, speakers, digitizers, vocoders, decoders, and the like, to convert between audio and digitized packets that are compatible with system 10 (see FIG. 1). Likewise, I/O section 64 may include a keypad for controlling the operation of SU 24 by a user. In an SO 16 or SIM 28, I/O section 64 may include keyboards, displays, magnetic memory devices, printers, and other devices conventionally coupled to computerized equipment. In an SO 16, I/O section 64 may additionally include components for coupling to a PSTN 22 (see FIG. 1).

In short, each node 48 represents a programmable machine which takes on the character assigned to it by software programming located in memory 58 and executed by controller 54. As is discussed below, the present invention configures nodes 48 as measurement processors 66 (see FIG. 4), location processors 68 (see FIG. 5), service processors 70 (see FIG. 7), call processors 72 (see FIG. 8), and the like. Since each node 48 is or may be in data communication with other nodes 48, the precise location and distribution of many of these processors and the tasks they perform are less important considerations. By way of example, the functions of SIMs 28 may be performed on the same hardware which performs the functions of SOs 16, or the functions may be performed on different hardware. While the differences between processors 66, 68, 70, and 72 may be physical due to their location in different ones of SUs 24, satellites 14, SOs 16, and SIMs 28. Absent the controlling software, any physical differences may be of only minor importance. Rather, the differences between processors 66, 68, 70, and 72 are logical. These logical differences results in different physical operation of processors 66, 68, 70 and 72.

FIGS. 4–5 and 7–8 depict processors 66, 68, 70, and 72, which are implemented by nodes 48 within radio telecommunication system 10. Those skilled in the art will appreciate that the processors discussed below in connection with FIGS. 4–5 and 7–8 are controlled by programming instructions placed in a memory 58 of the node 48 where that processor may be located. Moreover, in the preferred embodiment of the present invention, all SUs 24, satellites 14, SOs 16, and SIMs 28 perform substantially the same processes as other SUs 24, satellites 14, SOs 16, and SIMs 28, respectively. Thus, while the description presented below is directed toward a single SU 24, a single satellite 14, a single SO 16, a single SIM 28, and a single call, the following description may be viewed as applying to all SUs 24, satellites 14, SOs 16, SIMs 28, and calls.

Figure 4:
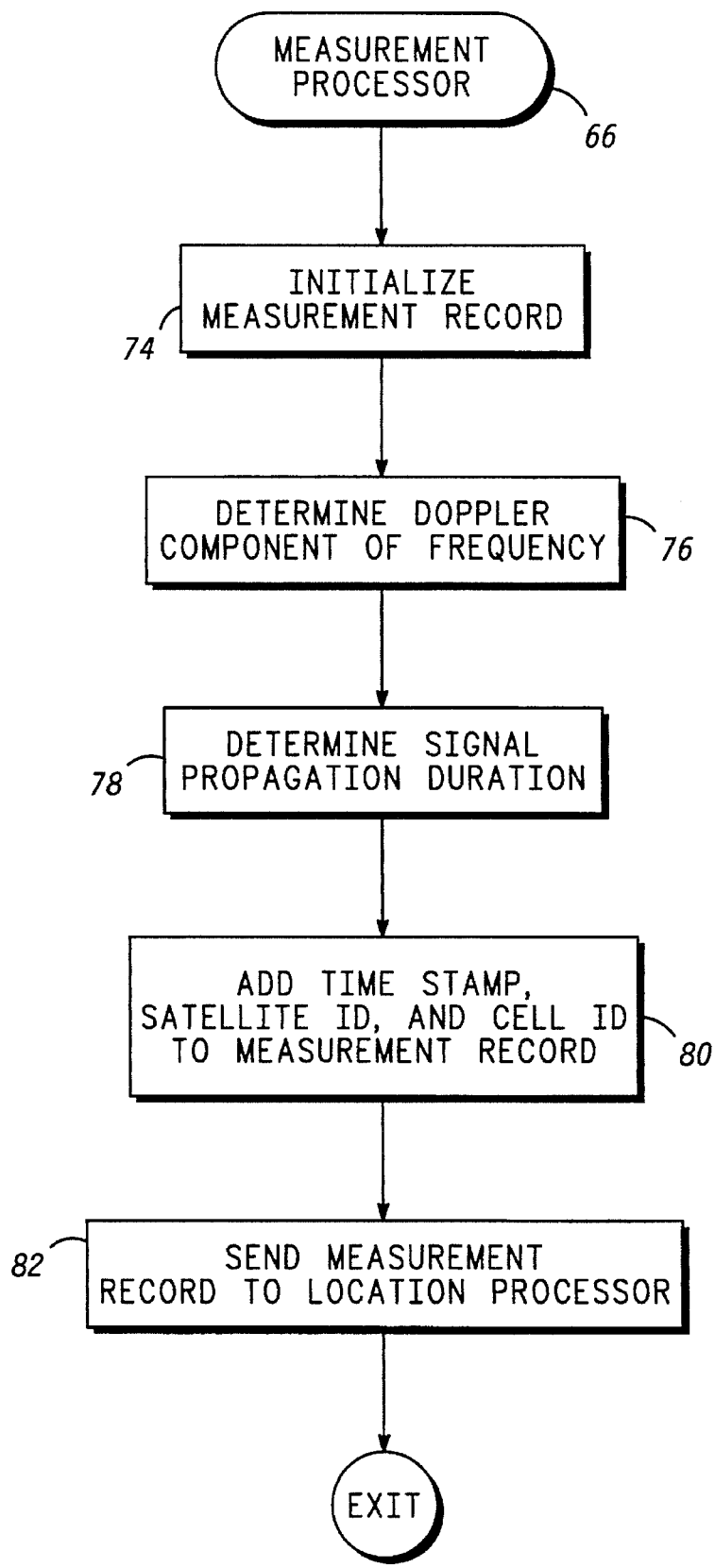
FIG. 4 shows a flow chart of tasks performed by a measurement processor portion of the radio telecommunication system.

FIG. 4 shows a flow chart of tasks performed by measurement processor 66. The preferred embodiment of the present invention implements measurement processor 66 in satellite 14. However, those skilled in the art could adapt measurement processor 66 to SU 24 for other systems. Radio telecommunication system 10 activates measurement processor 66 with respect to a single specific SU 24 to obtain data which may be manipulated to determine the location of the SU 24. Any one of several different events may lead to the activation of processor 66. For example, processor 66 may be automatically activated when an SU 24 initially powers up, when an SU 24 is requesting to setup a call to a called party, or when location processor 68, discussed below (see FIG. 5), requests its activation.

Measurement processor 66 operates in-conjunction with communications taking place between SU 24 and satellite 14. As is conventional in cellular communications, these communications take place within a particular one of cells 34 (see FIG. 2). Once activated by SU 24 accessing system 10, by SU 24 attempting to setup a call to a called party, by an instruction from location processor 68 (see FIG. 5), or otherwise, processor 66 performs a task 74 to initialize a measurement record. This initialization may, for example, include the writing of an SU's ID to the measurement record along with other parameters, such as frequency or channel ID, that describe the communications taking place between satellite 14 and SU 24.

After task 74, processor 66 performs a task 76 to determine the Doppler component of the frequencies used in communication channel 26 (see FIG. 1) for any electromagnetic signal traveling between SU 24 and satellite 14. This determination may, for example, be made by first synchronizing a time base used in SU 24 to the time base of satellite 14, then measuring a received signal to determine frequency offset from a predetermined frequency. However, any alternate Doppler measurement technique known to those skilled in the art may be used as well. Task 76 then adds data describing the Doppler component to the measurement record.

In conjunction with task 76, or after task 76 as shown in FIG. 4, a task 78 determines signal propagation duration (i.e. the propogation delay) for any electromagnetic signal traveling between SU 24 and satellite 14. As discussed above, this duration may be in the range of 2–3 msec or more. This determination may be made by first synchronizing a time base used in SU 24 to the time base of satellite 14, then measuring a received signal to determine any temporal offset from a predetermined point in time. However, any alternate propagation delay measurement technique known to those skilled in the art may be used as well. Task 78 then adds data describing the propagation duration to the measurement record.

After task 78, a task 80 completes the measurement record by adding a time stamp, the satellite's ID, and the ID of the cell 34 (see FIG. 2) within which the measured communications were conducted. The time stamp defines the point in real time at which the communications were taking place between SU 24 and satellite 14. After task 80, a task 82 sends the measurement record to location processor 68 (see FIG. 5) so that location processor 68 may determine the location of SU 24.

In the preferred embodiment, a location processor 68 resides in each SIM 28 (see FIG. 1). The particular SIM 28 which receives the measurement record is the home 28 for the SU 24 whose location is being determined. This particular home SIM 28 may be distinguished from other SIMs 28 through the SU's ID. After task 82, program control exits measurement processor 64, and processor 64 becomes inactive. However, processor 64 may be reactivated at any time with respect to this or another SU 24. Moreover, nothing prevents processor 64 from being configured in a reentrant fashion to simultaneously take measurements for more than one SU 24 at a time.

Figure 5:
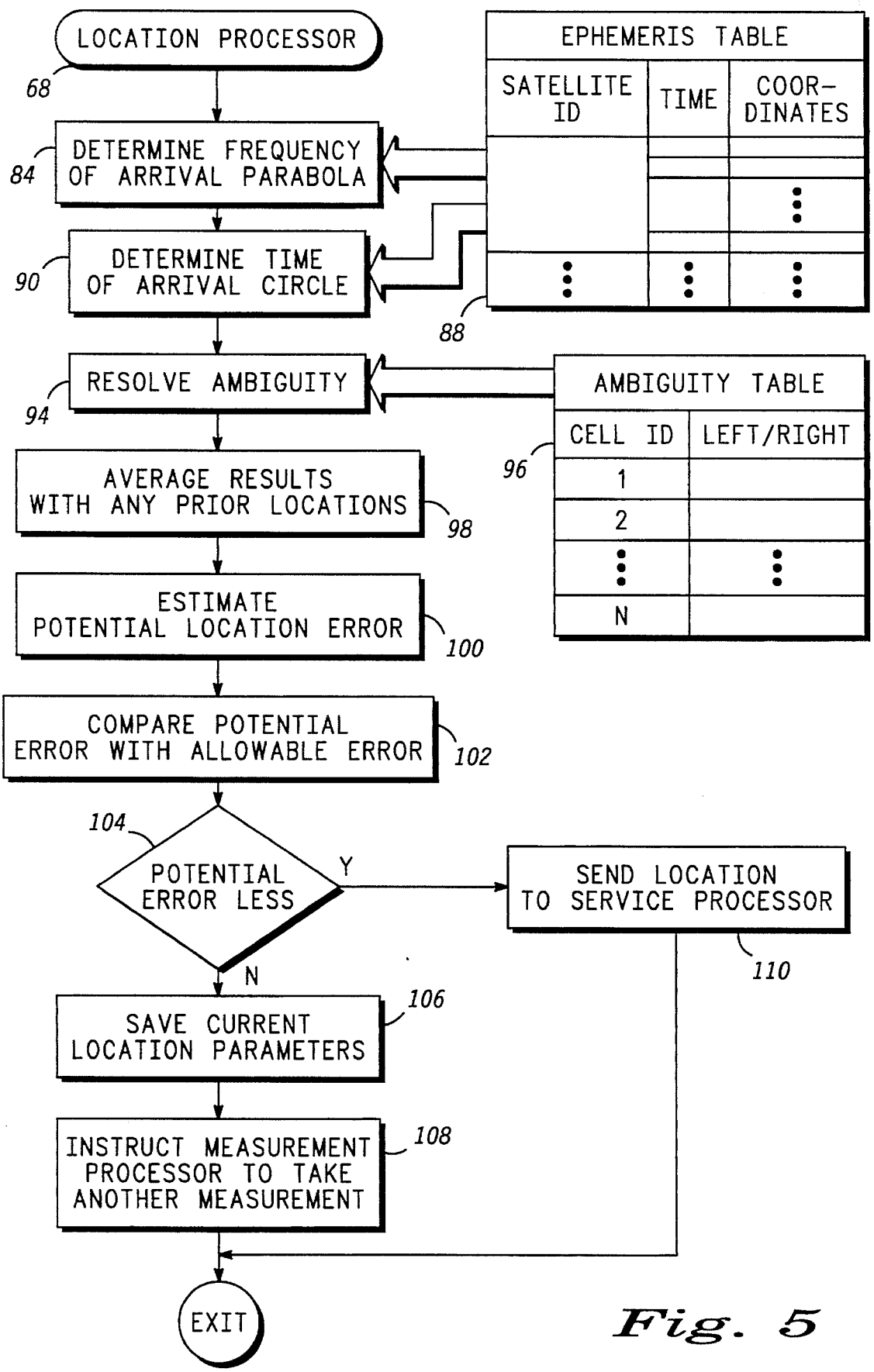
FIG. 5 shows a flow chart of tasks performed by a location processor portion of the radio telecommunication system.

FIG. 5 shows a flow chart of tasks performed by location processor 68. The preferred embodiment of the present invention implements a location processor 68 in each SIM 28. In particular, the home SIM 28 for an SU 24 implements a location processor 68 for that SU 24. However, those skilled in the art could adapt location processor 68 for implementation in any other node 48 (see FIG. 3) of system 10, or an independent node (not shown) can be established to implement a single location processor 68 for the entire system 10 and all SUs 24. Radio telecommunication system 10 activates location processor 68 with respect to a specific SU 24 when a measurement record relating to that SU 24 is received at the node 48 within which location processor 68 resides. Location processor 68 translates the data obtained in the measurement record into a location for the SU 24.

In particular, location processor 68 performs a task 84 to determine a frequency of arrival hyperbola to fit the Doppler component data contained in the measurement record. Since satellites 14 are orbiting the earth and SUs 24 are located on or near the earth's surface, the direction with which a satellite 14 moves with respect to an SU 24 continually changes. Since this direction continually changes but satellite orbital speed remains relatively constant, the component of satellite velocity relative to SU 24 continually changes. As a result of the continual velocity change, the Doppler component continually changes relative to a stationary SU 24 near the earth's surface. On the other hand, a given Doppler component could be reported from any point located on a generally hyperbolic shape and geographically centered roughly about satellite ground track 36 (see FIG. 2) and extending away from the satellite 14.

Figure 6:
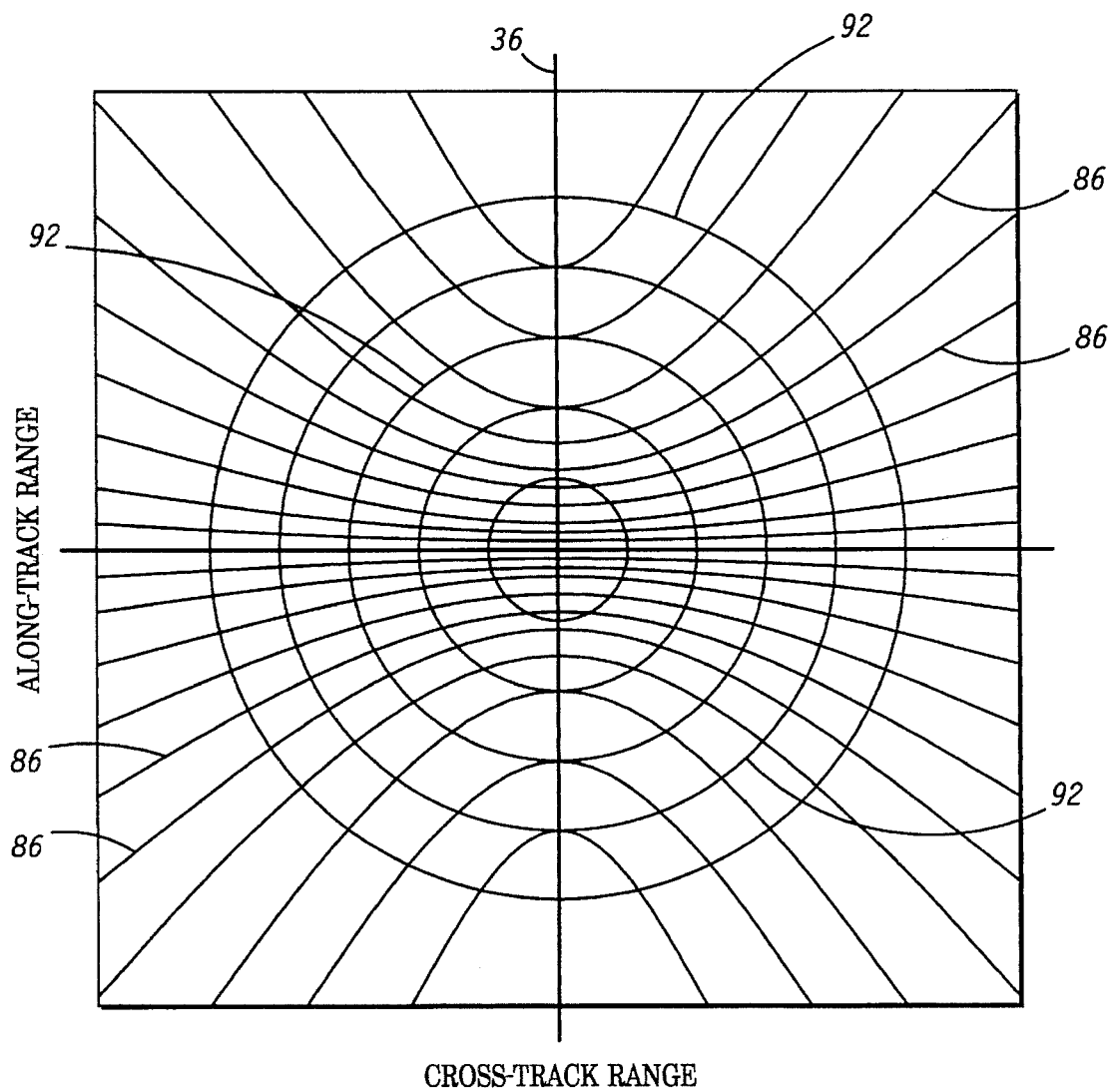
FIG. 6 graphically depicts constant Doppler and constant propagation duration curves which illustrate location determination in the radio telecommunication system.

FIG. 6 graphically depicts constant Doppler curves 86. Ignoring earth rotation, a given Doppler component may be graphically plotted on the surface of the earth as a hyperbola centered along satellite ground track 36 and extending away from a satellite 14. Higher Doppler rates result in thinner hyperbolas 86. At zero Doppler, which occurs when a satellite 14 is directly overhead an SU 24, the Doppler curve has an infinite width and resembles a straight line roughly perpendicular to satellite ground track 36. The frequency of arrival curve determined in task 84 (see FIG. 5) represents the curve 86 that describes the Doppler component indicated in the measurement record.

Those skilled in the art will appreciate that a constant Doppler curve in three-dimensional space is actually a hollow, three-dimensional hyperperbola, or hyperboloid. With reference back to FIG. 5, the results of task 84 do not describe the perimeter of this hyperboloid but the two-dimensional intersection of this hyperboloid on the surface of the earth. For convenience, the constant Doppler curves 86 shown in FIG. 6 ignore the distortion in shape caused by the curvature of the earth and the rotation of the earth.

Furthermore, task 84 translates the frequency of arrival hyperbola from coordinates which are centered upon the satellite or the satellite's nadir direction into earth coordinates. Since satellite 14 travels in a predictable orbit, this translation may take place by consulting an ephemeris table 88, a block diagram of which is illustrated in FIG. 5. Ephemeris table 88 may be retained in memory 58 (see FIG. 3) of the node 48 (see FIG. 3) which implements location processor 68. Table 88 assigns earth coordinates for satellites 14 as a function of time. By using satellite ID, time stamp data from the measurement record, and orbital geometry for satellite 14, task 84 may assign the frequency of arrival hyperbola earth coordinates.

While the preferred embodiment of the present invention directly uses Doppler components, those skilled in the art will appreciate that Doppler may be used indirectly to identify other location curves. For example, those skilled in the art will appreciate that the above-described orbital geometry produces a Doppler component which changes in time. Nothing prevents detecting Doppler change and fitting curves to Doppler change rather than direct Doppler. Those skilled in the art will understand that the term Doppler as used herein is intended to encompass all such indirect usages of Doppler as well as direct usage of Doppler.

After task 84 determines the frequency of arrival hyperbola on the surface of the earth, a task 90 determines a time of arrival circle which fits the propagation duration data contained in the measurement record. Since electromagnetic signals propagate through the atmosphere at a constant velocity of approximately the speed of light, a given propagation duration dictates that the source of a signal responsible for the propagation duration must reside on the surface of a sphere having a radius approximately equal to the propagation duration times the speed of light and centered at the point where the signal is received. When the source of an electromagnetic signal is SU 24 residing on or near the surface of the earth and the signal is received at satellite 14 orbiting the earth, a time of arrival circle represents the intersection of the sphere with the earth's surface.

FIG. 6 graphically depicts constant time of arrival circles 92. As shown in FIG. 6, a given propagation duration may be graphically plotted on the surface of the earth as a circle centered at the point on satellite ground track 36 where the satellite's nadir direction intersects the surface of the earth. Longer propagation durations result in circles having larger radii. The time of arrival curve determined in task 90 (see FIG. 5) represents the circle 92 that describes the propagation duration indicated in the measurement record. Referring back to FIG. 5, task 90 may consult ephemeris table 88 to convert the time of arrival circle from satellite-based coordinates into earth-based coordinates.

Referring to FIG. 6, the intersection of a specific (doppler) frequency of arrival curve 86 with a specific time of arrival curve 92 provides a two-position solution to the location determination problem. One of these two positions resides to the right of satellite ground track 36 and the other resides to the left of satellite ground track 36. Of course, the two-position solution is ambiguous because only one of these two solutions is correct.

Referring back to FIG. 5, after tasks 84 and 90 have determined frequency and time of arrival curves, a task 94 resolves the ambiguity presented by the two-position solution for locations not under the satellite ground track. As shown in FIG. 2, each of cells 34 projected by satellite 14 has a unique ID associated with it. In addition, a first portion of these cells 34 resides to the right of ground track 36 and a second portion of these cells 34 resides to the left of ground track 36. Task 94 may consult an ambiguity table 96, a block diagram of which is shown in FIG. 5, to resolve this ambiguity. Table 96 is constructed to associate left-of-ground-track and right-of-ground-track status indications with each cell 34 included in a footprint 30 (see FIG. 2). Table 96 may be stored in memory 58 (see FIG. 2) of the node 48 (see FIG. 2) within which location processor 68 resides. Table 96 is constant unless cells 34 are reanalyzed or shifted relative to nadir track 36. Using the cell ID data included in the measurement record, task 94 can look up a left/right status indication in table 96. With this status indication, task 94 selects one of the two positions and rejects the other. At this point in the process, location processor 68 has determined a location for SU 24.

However, the accuracy of the location determined at task 94 may not be sufficient. Many factors may contribute to inaccuracies. Some of the most prominent factors relate to the nature of frequency and time of arrival curves 86 and 92, shown in FIG. 6. Referring to FIG. 6, at locations where frequency of arrival hyperbolas 86 intersect time of arrival circles 92 at nearly right angles, small errors in Doppler component or propagation duration measurements result in small geographic location errors. These locations are found further away from the point where the satellite's nadir direction intersects the surface of the earth, particularly to the left and right of the satellite's ground track 36. The more tangential the frequency of arrival hyperbolas are to an intersecting time of arrival circle, the greater the geolocation error which results from small measurement errors. Moreover, the error is typically greater in a direction parallel to satellite ground track 36 than in a direction perpendicular to satellite ground track 36.

Referring back to FIG. 5, location processor 68 may make more than one location determination for any SU 24 before concluding that sufficient accuracy has been achieved. Additional location determinations are performed through additional activations of location processor 68. Thus, location processor 68 may perform a task 98 to combine, using a least squared method, or otherwise combine the location results obtained above in task 94 with any prior results. Of course, those skilled in the art will appreciate that such combining may alternatively take place above in tasks 84, 90, and 94 as well. The combining of results from additional iterations of the location process causes the location accuracy to improve.

By averaging or otherwise combining a plurality of location results obtained from a plurality of activations of processor 68, those skilled in the art will appreciate that a wide variety of "averaging" or "combining" techniques are contemplated by the present invention. For example, the preferred embodiments average positions through the use of well known minimum least squares error or maximum likelihood curve fitting techniques. However, those skilled in the art may devise other combining techniques to cause a plurality of error-prone location parameter measurements to converge on a solution for the actual location of subscriber unit 24.

After task 98, a task 100 estimates potential location error associated with the location determined so far by location processor 68. This potential location error is a function of the determined location relative to the satellite 14. The estimated potential error resembles an ellipse (not shown) that is centered at the location. At positions where error is minimal, the ellipse is more circular and covers a relatively small area. At positions where error is greater, the ellipse's area increases and its shape becomes more flattened with a major axis extending perpendicular to the satellite's ground track.

After task 100, a task 102 compares the potential location error with a predetermined allowable error. The allowable error is determined by system constraints. The allowable error resembles a circle (not shown) centered at the determined location and having a radius of a predetermined distance. Task 102 compares the area of the potential error ellipse with the area of the allowable error circle.

After task 102, a query task 104 determines whether the potential location error is less than the allowable error. The potential error is less if a predetermined percentage of the area of the potential error ellipse fits within the allowable error circle. While tasks 100, 102, and 104 describe one technique for causing error associated with location determination to converge to an acceptable level, other curve fitting and statistical techniques known to those skilled in the art may be applied as well.

If the potential location error is not less than the allowable error, a task 106 saves the current location parameters for averaging or otherwise combining with measurements from a future iteration of location processor 68 with respect to the SU 24. After task 106, a task 108 sends a message to measurement processor 66 (see FIG. 4) to instruct it to take another measurement. After task 108, program control exits location processor 68, and location processor 68 becomes temporarily inactive with respect to the SU 24 and this location determination. However, when the next measurement record is received for the SU 24 at the node 48 where location processor 68 resides, location processor 68 reactivates.

When task 104 determines that the potential location error is less than the allowable error, a task 110 sends the location to service processor 70 (see FIG. 7), discussed below, in a location-determined message. At this point, this location determination is complete, and program control exits. Location processor 68 again becomes inactive. However, location processor 68 reactivates for other location determinations, whether for this or other SUs 24.

Figure 7:
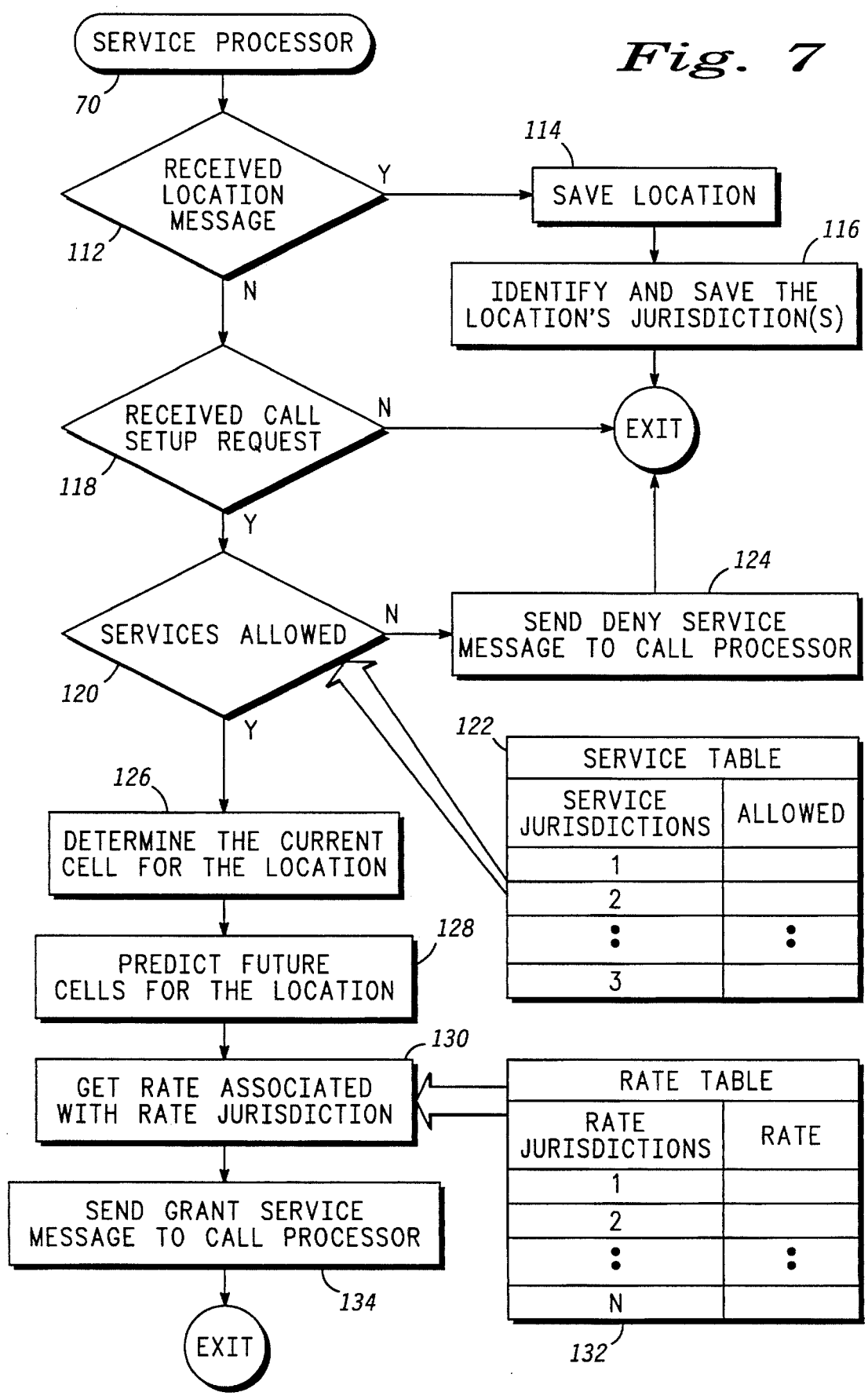
FIG. 7 shows a flow chart of tasks performed by a service processor portion of the radio telecommunication system.

FIG. 7 shows a flow chart of tasks performed by service processor 70. The preferred embodiment of the present invention implements a service processor 70 in each SIM 28. In particular, the home SIM 28 for an SU 24 implements service processor 70 for that SU 24. However, those skilled in the art could adapt service processor 70 for implementation in any other node 48 (see FIG. 3) of system 10, or an independent node (not shown) can be established to implement a single service processor 70 for the entire system 10. Generally speaking, service processor 70 qualifies communication services provided by system 10 to the SU 24 and its user in response to the location indicated in the location-determined message.

Radio telecommunication system 10 activates service processor 70 with respect to a single specific SU 24 when a location-determined message relating to that SU 24 is received at the node 48 within which service processor 70 resides. In addition, service processor 70 is activated when a call setup request message is received from a call processor 72 (see FIG. 8), discussed below. This node 48 may be the same node 48 which implements location processor 68 (see FIG. 5), and the location-determined message may be delivered by placing the message in an appropriate queue being managed in memory 58 of that node 48.

In particular, service processor 70 performs a query task 112 to determine whether a location-determined message has been received. If a location-determined message has been received, a task 114 saves the location data contained in the message in association with the SU 24 to which the location relates. After task 114, a task 116 identifies all relevant jurisdictions, discussed above in connection with FIG. 2, within whose domains the location resides. The jurisdictions may be geopolitical jurisdictions, rate jurisdictions, feature jurisdictions, and the like. When the jurisdictions are identified, IDs associated with the relevant jurisdictions are saved in association with the SU 24 to which the location relates for future use by service processor 70. After task 116, program control exits service processor 70, and service processor 70 becomes inactive.

When task 112 determines that a location message has not been received, a query task 118 determines whether a call setup request message has been received at service processor 70 with respect to the SU 24. As discussed below, the call setup request message is sent by call processor 72 when someone is attempting to setup a call involving the SU 24. The SU 24 may be either a calling party or a called party. If a call setup request message has not been received, program control exits service processor 70, and service processor 70 becomes inactive.

When a call setup request message is received, a query task 120 determines whether communication services are allowed for the SU 24. In deciding whether communication services are allowed for the SU 24, task 118 may consult a service table 122 stored in memory 58 of the node 48 which implements service processor 70. Service table 122 associates service jurisdictions with indications of whether communication services are allowed or not. The service jurisdictions may, for example, be geopolitical jurisdictions. These jurisdictions were identified above in connection with task 116.

If communication services are not allowed, a task 124 is performed to send a deny service message to the call processor 72 (see FIG. 8) which sent the call setup request message to service processor 70. That call processor 72 will take appropriate steps to realize the qualification to communication services indicated through task 124. After task 124, program control exits service processor 70, and service processor 70 becomes inactive.

If task 120 determines that communication services are allowed, a task 126 determines the current satellite 14 and cell 34 that cover the location saved above in task 114 for this SU 24. This satellite 14 and cell 34 may be different from the satellite 14 and cell 34 which were involved in location determination, discussed above, due to the movement of satellites 14. This determination may be made by applying the current time and the location saved above in task 114 to the orbital geometry associated with constellation 12 (see FIG. 1) of satellites 14. After task 126, a task 128 predicts cell track 40 (see FIG. 2) for the SU's location through cells 34 for an upcoming predetermined duration. Preferably, this duration is greater than the average length of a call. This determination may be made by applying the upcoming predetermined duration and the SU's location to the orbital geometry associated with constellation 12 of satellites 14. Preferably, this prediction takes the form of a schedule which associates timing data with cell IDs. Each item of timing data may indicate when the SU's location will begin to be covered by another cell 34, and an associated cell ID may identify the upcoming cell 34.

After task 128, a task 130 gets a call rate to be used for the upcoming call. Task 130 may consult a rate table 132 stored in memory 58 of the node 48 which implements service processor 70. Rate table 132 associates rate jurisdictions with rate descriptions. Any rate description conventional in the art of telephony is contemplated for rate table 132. Such rate descriptions may be complex formulas which vary rates depending on time of day, direction of call, number of minutes over which a call takes place, and the like. These rate jurisdictions were identified above in connection with task 116. They may or may not correspond to the service jurisdictions discussed above in connection with task 120.

After task 130, a task 134 sends a grant service message to the call processor 72 (see FIG. 8) that sent the call setup request message to service processor 70. In addition, if SU 24 is the called party, task 134 may send the grant service message to a call processor 72 that is serving SU 24. This called-party call processor 72 may be identified by the location information saved in task 114 or by a jurisdiction identified above in task 116.

The grant service message will include the cell, cell track schedule, and rate data determined above in tasks 126, 128, and 130. Call processor 72 will continue setting up the requested call, and the communication services provided by system 10 throughout the call will be qualified through the cell, cell track schedule, and rate data included in the grant service message. After task 134, the communication services to be offered for the call have been qualified in response to the SU's location, and program control exits service processor 70. Service processor 70 again becomes inactive. However, service processor 70 reactivates for other location-determined messages or other call setup request messages, whether for this or other SUs 24. While the service processor 70 discussed above qualifies communication services based on an SU's location, nothing prevents other processors from qualifying communication services based on other factors, such as payment of accounts. Alternatively, service processor 70 may be expanded to qualify communication services based on such other factors as well as an SU's location.

Figure 8:
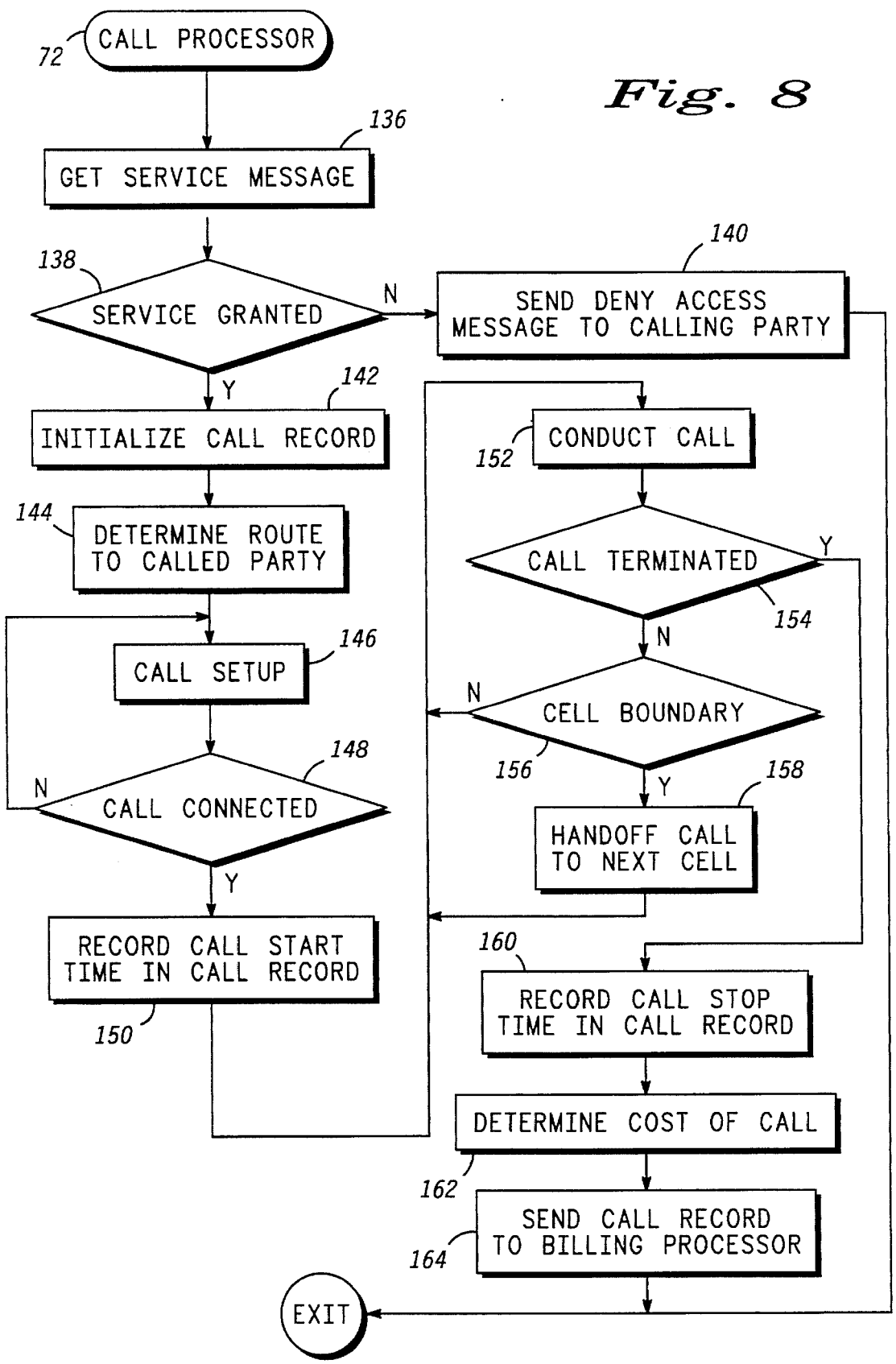
FIG. 8 shows a flow chart of tasks performed by a call processor portion of the radio telecommunication system.

FIG. 8 shows a flow chart of tasks performed by call processor 72. The preferred embodiment of the present invention implements call processor 72 in SOs 16 (see FIG. 1). However, those skilled in the art could adapt call processor 72 for implementation in any other node 48 (see FIG. 3) of system 10, or an independent node (not shown) can be established to implement a single call processor 72 for the entire system 10. Generally speaking, call processor 72 sets up and manages a call that involves the SU 24. This management realizes the qualifications to communication services based on the SU's location, as defined by service processor 70 (see FIG. 7).

Radio telecommunication system 10 activates call processor 72 with respect to a single specific SU 24 when system 10 receives a request to setup a call that involves the SU 24. The SU 24 may be either the calling party or the called party. In particular, call processor 72 performs a task 136 to get a service message from service processor 70 (see FIG. 7). If SU 24 is the called party, then call processor 72 may be activated upon the receipt of the grant service message, discussed above, and this service message is immediately available. If SU 24 is the calling party, call processor 72 may be activated by a controlling message from SU 24 requesting the placement of a call. When SU 24 is the calling party, task 136 first sends a call setup request message to service processor 70 (see FIG. 7). Task 136 then waits to receive either a deny service or grant service message from that service processor 70.

After task 136, a query task 138 examines the message obtained above in task 136 to determine whether communication services have been granted. If services have been denied, a task 140 formulates and sends a deny access message to the calling party. This message informs the calling party that communication services are not available. After task 140, program control exits call processor 72, and call processor 72 becomes inactive with respect to this call and SU 24. No call will take place through system 10.

When task 138 determines that services have been granted, a task 142 initializes a call record for the upcoming call. This call record will include parameters which describe the upcoming call for billing, statistical, and other purposes. The call record may include an ID for the call itself, IDs for the calling and called parties, and the rate description received in the grant service message from service processor 70 (see FIG. 7).

Next, a task 144 determines a destination or route to the called party. If SU 24 is a calling party, this destination or route can be determined by examining the ID or phone number of the called party. If SU 24 is the called party, this destination or route can be determined by examining the data identifying the current satellite 14 and cell 34 (see FIG. 2) for the SU's location received in the grant service message from service processor 70 (see FIG. 7).

After task 144, call processor 72 performs a call setup process 146. The present invention contemplates the use of conventional call setup techniques during call setup process 146. For example, process 146 handles ringing the called party, determining when the called party answers, detecting whether the call is terminated prior to answering, the allocation or establishment of communication channels connecting the opposing parties in the call, and the like.

During process 146, or after as shown in FIG. 8, a query task 148 determines whether the call has been connected. If the call has not been connected, program control loops back to process 144. When the call is connected, a task 150 records the call's start time in the call record. Next, a task 152 conducts the call. This call may be initially conducted in the cell identified by the grant service message. Call processor 72 need not take any specific action to conduct the call because communication channels have been allocated at this point. Rather, call processor 72 may look for messages which relate to the control of the call.

For example, a query task 154 determines whether the call has been terminated. If the call has not been terminated yet, a query task 156 determines whether the current real time matches the time indicated in the schedule received with the grant service message. As discussed above in connection with task 128 (see FIG. 7), the schedule may associate timing data with cell IDs. Thus, task 156 determines whether the SU's reported location is crossing a cell boundary by determining whether real time matches the scheduled time. So long as real time does not match scheduled time, program control loops back to task 152.

When real time matches the scheduled time, a task 158 causes the call to be handed off from its existing cell to the next cell, which is identified in the schedule. The present invention contemplates the use of conventional cellular telephony handoff techniques at task 158. In an alternate embodiment of the present invention, the schedule may be transferred from call processor 72 to either or both of a satellite 14 or the SU 24 involved in the call for handoff management. In addition, nothing prevents the use of handoff control techniques that monitor and compare the strengths of signals from diverse cells in conjunction with, or instead of, the scheduling of handoffs, as taught by task 158. After task 158, program control loops back to task 152 to continue the call.

When task 154 eventually determines that the call has been terminated, a task 160 records a call stop time in the call record. After task 160, a task 162 determines the cost of the call by applying the timing data recorded in the call record at tasks 150 and 160 to the rate description obtained in the grant service message. Task 162 qualifies the communication services provided to SU 24 and its user by causing rates to be dependent upon the location of SU 24. This cost may be recorded in the call record. After task 162, a task 164 sends the call record to a billing processor (not shown) which may be located at any node in system 10. The billing processor will then be responsible for billing in connection with the SU 24. In an alternate embodiment, the call record may be sent directly to the billing processor with other data that describe the location of SU 24. The billing processor could then have the responsibility of determining and calculating rates.

After task 164, program control exits call processor 72 with respect to this SU 24 and this call. Call processor 72 becomes inactive. However, call processor 72 reactivates when another request to involve an SU 24 in a call, whether this or another SU 24, is received at the node 48 where call processor 72 resides.

In summary, the present invention provides an improved radio telecommunication system and method. The system and method of the present invention automatically determine locations for subscriber units. A subscriber unit's location is determined using a satellite which orbits the earth in a low earth orbit. No more than one satellite needs to be used to determine a subscriber unit's location. Moreover, the low earth orbit is advantageous for communications because lower power subscriber units may be used and spectrum may be reused more efficiently. Once a location has been determined, the system and method of the present invention use this location to qualify communication services offered by the system. The subscriber unit's location may qualify the availability of services, the rates to charge for services, the handing off of calls between cells, and the routing of call messages.

The present invention has been described above with reference to preferred embodiments. However, those skilled in the art will recognize that changes and modifications may be made in these preferred embodiments without departing from the scope of the present invention. For example, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A method of operating a radio telecommunication system having at least one satellite moving in an orbit around the earth and having at least one subscriber unit located proximate the earth's surface, said method comprising the steps of:

determining a Doppler component of an electromagnetic signal traveling between said satellite and said subscriber unit;

determining a location of said subscriber unit relative to the earth in response to said Doppler component; and granting access to communication services provided by said radio telecommunication system for said subscriber unit in response to said location.

2. A method of operating a radio telecommunication system as claimed in claim 1 additionally comprising the step of determining a duration for which an electromagnetic signal travels between said satellite and said subscriber unit so that said location is determined in response to said Doppler component and said duration.

3. A method of operating a radio telecommunication system as claimed in claim 1 wherein:

said satellite movement causes a nadir direction of said one satellite to intersect the earth along a ground track of said satellite; and said determining a location step comprises the step of resolving upon which side of said satellite ground track said subscriber unit resides.

4. A method of operating a radio telecommunication system as claimed in claim 3 wherein:

a first plurality of cells are projected from said one satellite toward the earth on a first side of said satellite ground track, and a second plurality of cells are projected from said one satellite toward the earth on a second side of said satellite ground track;

said determining a Doppler component step comprises the step of engaging in communications between said one satellite and said one subscriber unit; and said resolving step comprises the step of determining whether said communications take place in one of said first plurality of cells or in one of said second plurality of cells.

5. A method of operating a radio telecommunication system as claimed in claim 1 wherein said granting access step comprises the steps of:

identifying a jurisdiction within which said location resides;

enabling communication services provided by said telecommunication system to said subscriber unit if said location resides within a first one of said jurisdictions; and denying said subscriber unit access to communication services provided by said telecommunication system if said location resides within a second one of said jurisdictions.

6. A method of operating a radio telecommunication system as claimed in claim 1 wherein:

said method additionally comprises the step of associating call rates for communication services with jurisdictions;

said method additionally comprises, after said determining a location step, the step of conducting a call involving said subscriber unit; and said granting access step comprises the step of determining a cost for said call, said cost being determined in response to one of said call rates, said one of said call rates being associated with a jurisdiction within which said location resides.

7. A method of operating a radio telecommunication system as claimed in claim 1 wherein said radio telecommunication system is a cellular system in which cells are projected toward the earth from said one or more satellites, and said cells move relative to the earth, and wherein said method additionally comprises the steps of:

saving data describing said location;

receiving a request to place a call to said subscriber unit; and routing, in response to said request and said location data, a call set-up message to the one of said cells which covers said location.

8. A method of operating a radio telecommunication system as claimed in claim 1 wherein said determining a location step comprises the steps of:

determining a first location in response to said Doppler component;

estimating potential location error associated with said first location;

comparing said estimated potential location error with a predetermined error;

determining a second Doppler component when said estimated potential location error exceeds said predetermined error; and determining a second location in response to said Doppler and said second Doppler components when said estimated potential location error exceeds said predetermined error.

9. A method of operating a radio telecommunication system having at least one satellite moving in an orbit around the earth in which a nadir direction of said one satellite intersects the earth along a satellite ground track, and said system having at least one subscriber unit located proximate the earth's surface, said method comprising the steps of:

determining a Doppler component of an electromagnetic signal traveling between said satellite and said subscriber unit;

determining a duration for which an electromagnetic signal travels between said satellite and said subscriber unit;

determining two potential positions of said subscriber unit relative to the earth in response to said Doppler component and said duration;

selecting one of said two potential positions as a location for said subscriber unit by resolving upon which side of said satellite ground track said subscriber unit resides; and granting access to communication services provided by said radio telecommunication system for said subscriber unit in response to said location.

10. A method of operating a radio telecommunication system as claimed in claim 9 wherein:

said radio telecommunication system is a cellular system in which a first plurality of cells are projected from said one satellite toward the earth on a first side of said satellite ground track and a second plurality of cells are projected from said one satellite toward the earth on a second side of said satellite ground track;

said determining a duration step comprises the step of engaging in communications between said one satellite and said one subscriber unit; and said selecting step comprises the step of determining whether said communications take place in one of said first plurality of cells or in one of said second plurality of cells.

11. A method of operating a radio telecommunication system as claimed in claim 9 wherein said granting access step comprises the steps of:

identifying a jurisdiction within which said location resides;

enabling communication services provided by said telecommunication system to said subscriber unit if said location resides within a first one of said jurisdictions; and denying said subscriber unit access to communication services provided by said telecommunication system if said location resides within a second one of said jurisdictions.

12. A method of operating a radio telecommunication system as claimed in claim 9 wherein:

said method additionally comprises the step of associating call rates for communication services with jurisdictions;

said method additionally comprises, after said determining a location step, the step of conducting a call involving said subscriber unit; and said granting access step comprises the step of determining a cost for said call, said cost being determined in response to one of said call rates, said one of said call rates being associated with a jurisdiction within which said location resides.

13. A method of operating a radio telecommunication system as claimed in claim 9 additionally comprising the steps of:

estimating potential location error associated with said location;

comparing said estimated potential location error with a predetermined error; and repeating said determining steps and said selecting step when said estimated potential location error exceeds said predetermined error.

14. A method of operating a radio telecommunication system as claimed in claim 9 wherein said radio telecommunication system is a cellular system in which cells are projected toward the earth from said one or more satellites, and said cells move relative to the earth, and wherein said method additionally comprises the steps of:

saving data describing said location;

receiving a request to place a call to said subscriber unit; and routing, in response to said request and said location data, a call set-up message to the one of said cells which covers said location.

15. A radio telecommunication system for providing communication services to users, said system comprising:

a measurement processor configured to determine a Doppler component of an electromagnetic signal traveling between a satellite and a subscriber unit;

a location processor in data communication with said measurement processor, said location processor being configured to determine a location of said subscriber unit relative to the earth in response to said Doppler component; and a service processor in data communication with said location processor, said service processor being configured to grant access to communication services provided by said radio telecommunication system for said subscriber unit in response to said location.

16. A radio telecommunication system as claimed in claim 15 wherein:

said measurement processor is additionally configured to determine a duration for which an electromagnetic signal travels between said satellite and said subscriber unit; and said location processor is additionally configured so that said location is determined in response to said Doppler component and said duration.

17. A radio telecommunication system as claimed in claim 15 wherein:

movement of said satellite causes a nadir direction of said satellite to intersect the earth along a satellite ground track; and said location processor is additionally configured to resolve upon which side of said satellite ground track said subscriber unit resides.

18. A radio telecommunication system as claimed in claim 17 wherein:

said satellite projects a first plurality of cells toward the earth on a first side of said satellite ground track and a second plurality of cells toward the earth on a second side of said satellite ground track;

said satellite and said subscriber unit are mutually configured to engage in communications through any one of said cells; and said location processor comprises means for determining whether said communications take place in one of said first plurality of cells or in one of said second plurality of cells.

19. A radio telecommunication system as claimed in claim 15 wherein said service processor comprises:

means for identifying a jurisdiction within which said location resides;

means, responsive to said identifying means, for granting said subscriber unit access to communication services if said location resides within a first one of said jurisdictions; and means, responsive to said identifying means, for denying said subscriber unit access to communication services if said location resides within a second one of said jurisdictions.

20. A radio telecommunication system as claimed in claim 15 additionally comprising:

means for associating call rates for communication services with jurisdictions;

means, responsive to said associating means, for conducting a call involving said subscriber unit; and means, responsive to said call conducting means, for determining a cost for said call, said cost being determined in response to one of said call rates, said one of said call rates being associated with a jurisdiction within which said location resides.

* * * * *